(12) United States Patent
Groves et al.

(10) Patent No.: US 9,169,890 B2
(45) Date of Patent: Oct. 27, 2015

(54) LOW NOISE VALVE ASSEMBLY

(75) Inventors: Gary W. Groves, Toledo, OH (US); Ben Schaller, Toledo, OH (US); Darrell G. Breese, Ypsilanti, MI (US); Daniel T. Keil, Temperance, MI (US); Andrew M. Jacobson, Canton, MI (US); John P. McGahey, Trenton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 236 days.

(21) Appl. No.: 13/187,647

(22) Filed: Jul. 21, 2011

(65) Prior Publication Data

US 2013/0020159 A1 Jan. 24, 2013

(51) Int. Cl.
   *F16F 9/34* (2006.01)
   *F16F 9/348* (2006.01)
   *F16F 9/32* (2006.01)
   *F16K 1/42* (2006.01)

(52) U.S. Cl.
   CPC ............. *F16F 9/3484* (2013.01); *F16F 9/3214* (2013.01); *F16F 9/34* (2013.01); *F16F 9/3485* (2013.01)

(58) Field of Classification Search
   CPC ................. F16F 7/00; F16F 9/00; F16F 9/14; F16F 9/3214; F16F 9/0227; F16F 9/34; F16F 9/3405; F16F 9/348; F16F 9/3485; F16F 9/3484
   USPC .......... 188/322.13, 322.14, 322.15, 313–317, 188/282.5; 251/333, 359
   See application file for complete search history.

(56) References Cited

U.S. PATENT DOCUMENTS

| | | | |
|---|---|---|---|
| 3,729,025 A * | 4/1973 | Silvestrini | 137/625.33 |
| 4,899,855 A | 2/1990 | de Carbon | |
| 5,085,300 A * | 2/1992 | Kato et al. | 188/282.6 |
| 6,371,264 B1 | 4/2002 | Deferme | |
| 6,464,053 B1 | 10/2002 | Hoebrechts | 189/322.15 |
| 6,672,436 B1 * | 1/2004 | Keil et al. | 188/322.14 |
| 6,899,207 B2 | 5/2005 | Deferme et al. | 188/282.5 |
| 7,070,029 B2 | 7/2006 | Deferme | |
| 8,083,039 B2 * | 12/2011 | Vanbrabant | 188/322.15 |
| 2005/0056505 A1 | 3/2005 | Deferme | |
| 2005/0067238 A1 * | 3/2005 | Deferme et al. | 188/282.5 |
| 2006/0283676 A1 | 12/2006 | Deferme | |
| 2007/0034466 A1 | 2/2007 | Paesmans et al. | |
| 2009/0294232 A1 * | 12/2009 | Ashiba | 188/322.15 |

FOREIGN PATENT DOCUMENTS

JP  2009-505024  2/2009

OTHER PUBLICATIONS

Search Report and Written Opinion in corresponding PCT Application No. PCT/US2012/046136 dated Dec. 14, 2012.

* cited by examiner

*Primary Examiner* — Melody Burch
(74) *Attorney, Agent, or Firm* — Harness, Dickey & Pierce, P.L.C.

(57) ABSTRACT

A shock absorber includes a valve assembly which includes a valve disc engaging an inner and outer valve land defined by a valve body. The inner valve land is a non-circular valve land such that a radial dimension between the inner and outer valve land varies based upon a circumferential position of the radial dimension. The varying radial dimension provides a progressive valve opening for the valve assembly.

12 Claims, 5 Drawing Sheets

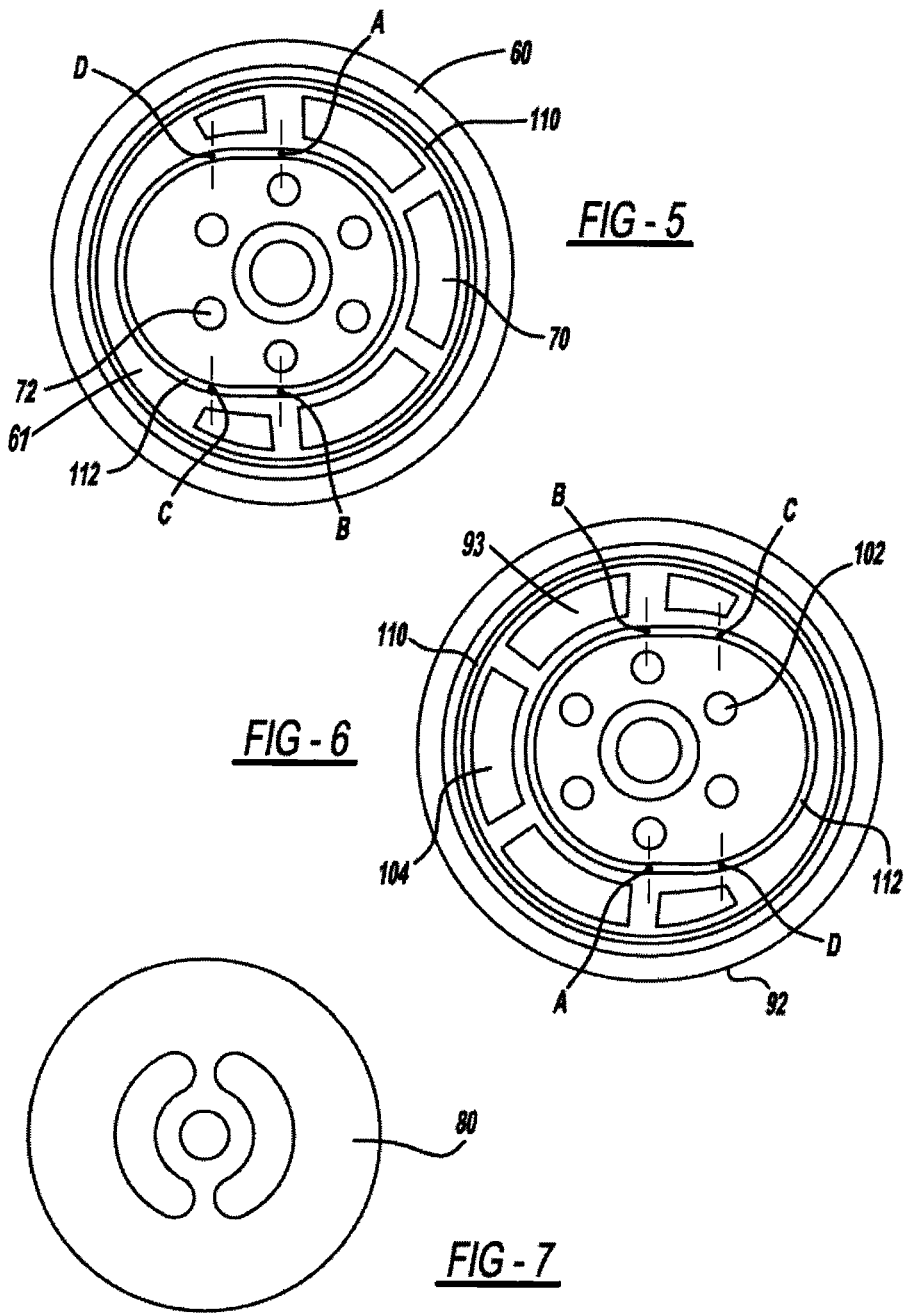

LOW NOISE VALVE ASSEMBLY

FIELD

The present disclosure relates generally to hydraulic dampers or shock absorbers for use in a suspension system such as a suspension system used for automotive vehicles. More particularly, the present disclosure relates to a valve assembly which has an eccentric pressure area on a valve disc to control the opening of the valve assembly.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to the unsprung portion of the vehicle. The piston is connected to the sprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed causing damping fluid to move through the base valve in a dual-tube shock absorber or through a piston valve on the piston in a mono-tube shock absorber. A damping valve located on the base valve or the piston controls the flow of damping fluid and thus the damping force created. During rebound movements, the shock absorber is extended causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce movements in a dual-tube shock absorber, the damping valve on the base valve opens the compression passages in the base valve to control fluid flow and produce a damping load. A fluid valve on the piston opens the compression passages in the piston to replace damping fluid in the upper working chamber but this check valve does not contribute or only partially contributes to the overall damping load. The damping valve on the piston closes the extension passages of the piston and a fluid valve on the base valve closes the extension passages of the base valve during a compression or jounce movement. During rebound movements in a dual-tube shock absorber, the damping valve on the piston opens the extension passages in the piston to control fluid flow and produce a damping load. The fluid valve on the base valve opens the extension passages in the base valve to replace damping fluid in the lower working chamber but this fluid valve does not contribute or only partially contributes to the overall damping load.

In a mono-tube shock absorber, the piston normally includes a plurality of compression passages and a plurality of extension passages. The shock absorber will also include means for compensating for the rod volume flow of fluid as is well known in the art. During jounce movements in a mono-tube shock absorber, the compression damping valve on the piston opens the compression passages in the piston to control fluid flow and produce a damping load. The extension damping valve on the piston closes the extension passages of the piston during a jounce movement. During rebound movements in a mono-tube shock absorber, the extension damping valve on the piston opens the extension passages in the piston to control fluid flow and produce a damping load. The compression damping valve on the piston closes the compression passages of the piston during a rebound movement.

For most dampers, the damping valves are designed as a normal close/open valve even though some valves may include a bleed flow of damping fluid. Because of this close/open design, pressure oscillations can occur. These pressure oscillations can result in high frequency vibrations being generated by the shock absorber which can create an unwanted disturbance.

SUMMARY

This section provides a general summary of the disclosure, and is not a comprehensive disclosure of its full scope or all of its features.

A valve assembly for a shock absorber includes a valve disc that seats against an inner and outer sealing land formed on a valve body. Fluid pressure acts against the valve disc in the area between the inner and outer sealing lands to move the valve disc off of the sealing lands. The distance between the inner sealing land and the outer sealing land varies radially in relation to a circumferential position between the inner and outer sealing lands. This controls the initial opening of the valve assembly. Then, as the fluid pressure increases, an additional circumferential area of the valve disc will open until the entire circumferential area of the valve disc is open.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 is a plan view of the piston body from the piston assembly illustrated in FIG. 3;

FIG. 6 is a plan view of the valve body from the base valve assembly illustrated in FIG. 4; and FIG. 7 is a plan view of the valve disc used in both the piston assembly illustrated in FIG. 3 and the base valve assembly illustrated in FIG. 4.

Corresponding reference numerals indicate corresponding parts throughout the several views of the drawings.

DETAILED DESCRIPTION

Example embodiments will now be described more fully with reference to the accompanying drawings.

Figure 1:
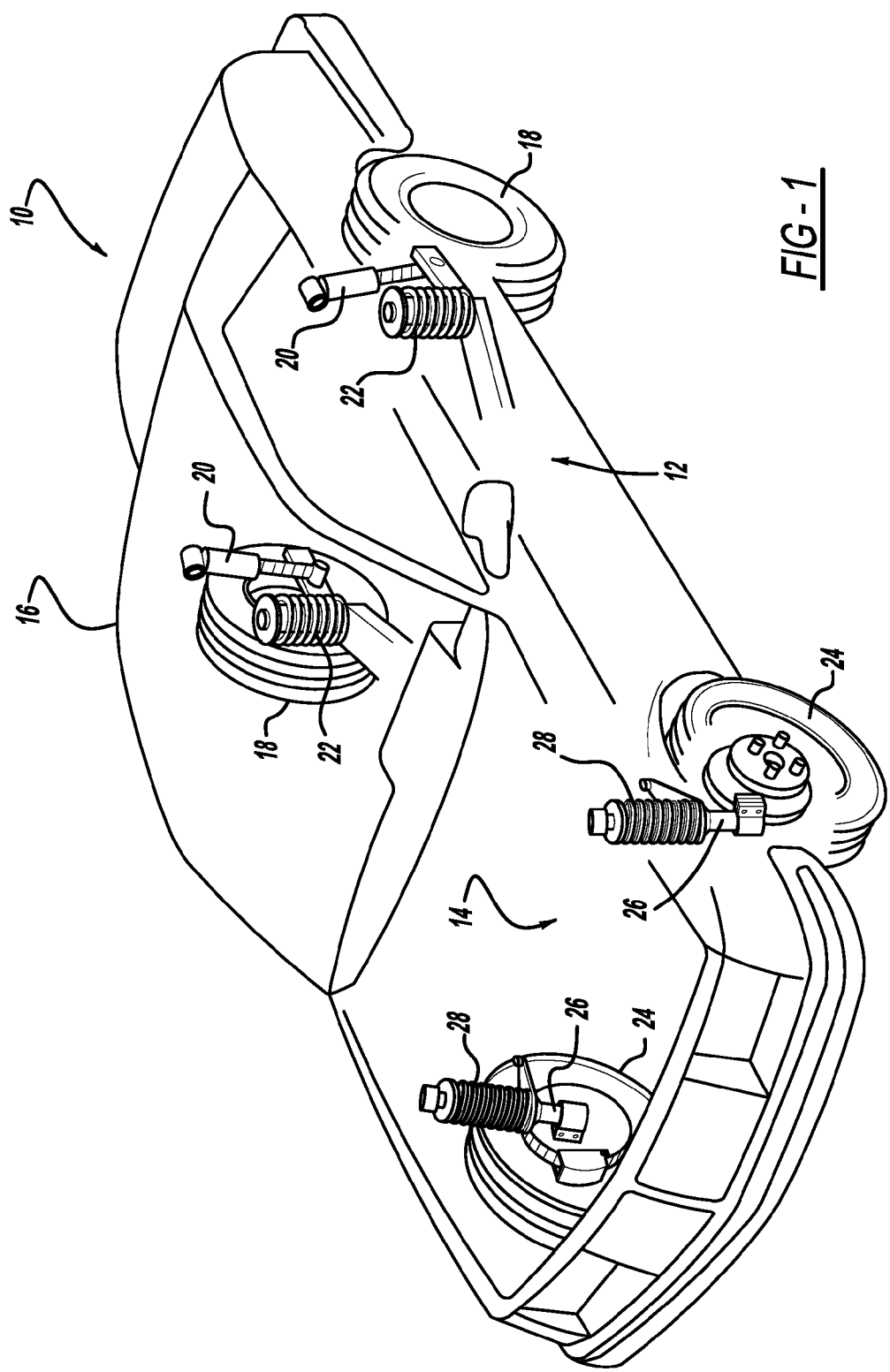
FIG. 1 is an illustration of an automobile having shock absorbers which incorporate the valve design in accordance with the present disclosure.

The following description is merely exemplary in nature and is not intended to limit the present disclosure, application, or uses. There is shown in FIG. 1 a vehicle incorporating a suspension system having shock absorbers, each of which incorporates a piston assembly in accordance with the present invention, and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
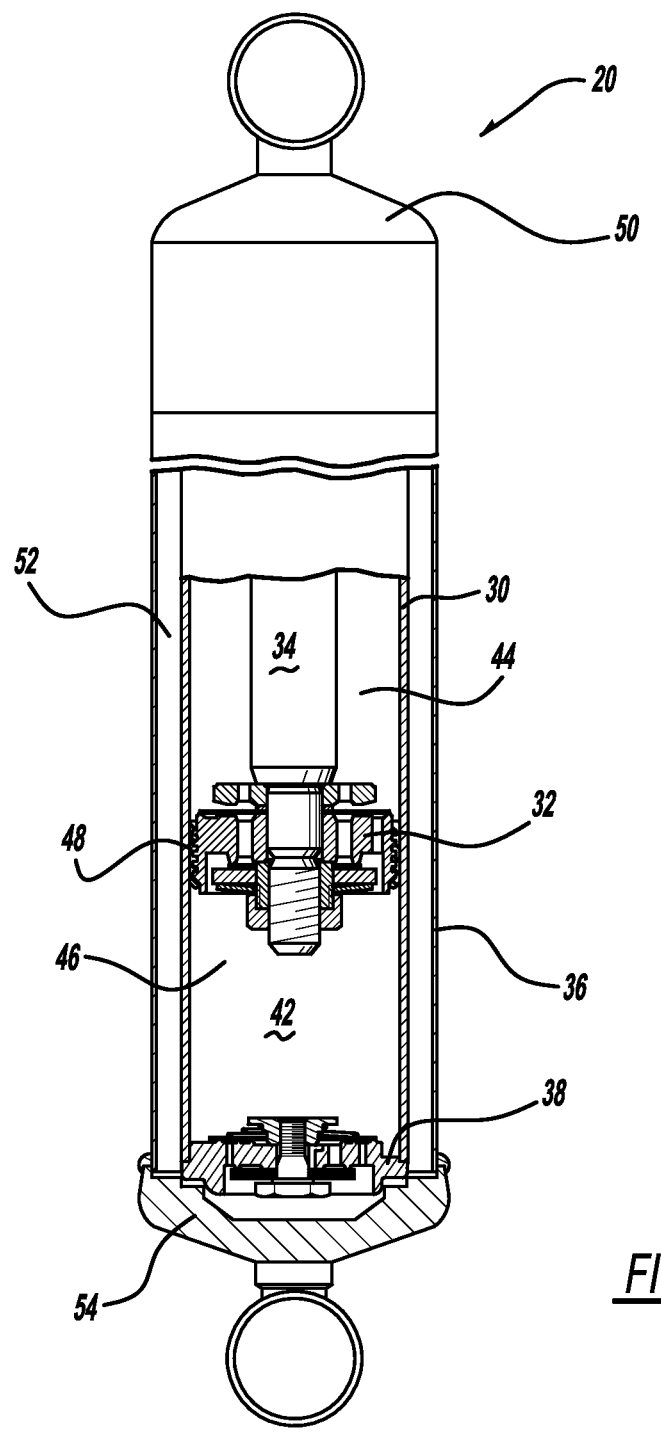
FIG. 2 is a side view, partially in cross-section of a dual-tube shock absorber from FIG. 1 which incorporates the valve design in accordance with the present disclosure.

Referring now to FIG. 2, shock absorber 20 is shown in greater detail. While FIG. 2 illustrates only shock absorber 20, it is to be understood that shock absorber 26 also includes the valve design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36 and a base valve assembly 38.

Pressure tube 30 defines a working chamber 42. Piston assembly 32 is slidably disposed within pressure tube 30 and divides working chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through upper end cap 50 which closes the upper end of pressure tube 30. A sealing system seals the interface between upper end cap 50, reserve tube 36 and piston rod 34. The end of piston rod 34 opposite to piston assembly 32 is adapted to be secured to the sprung mass of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38.

Reserve tube 36 surrounds pressure tube 30 to define a fluid reservoir chamber 52 located between tubes 30 and 36. The bottom end of reserve tube 36 is closed by a base cup 54 which is adapted to be connected to the unsprung mass of vehicle 10. The upper end of reserve tube 36 is attached to upper end cap 50. Base valve assembly 38 is disposed between lower working chamber 46 and reservoir chamber 52 to control the flow of fluid between chambers 46 and 52. When shock absorber 20 extends in length, an additional volume of fluid is needed in lower working chamber 46 due to the "rod volume" concept. Thus, fluid will flow from reservoir chamber 52 to lower working chamber 46 through base valve assembly 38 as detailed below. When shock absorber 20 compresses in length, an excess of fluid must be removed from lower working chamber 46 due to the "rod volume" concept. Thus, fluid will flow from lower working chamber 46 to reservoir chamber 52 through base valve assembly 38 as detailed below.

Figure 3:
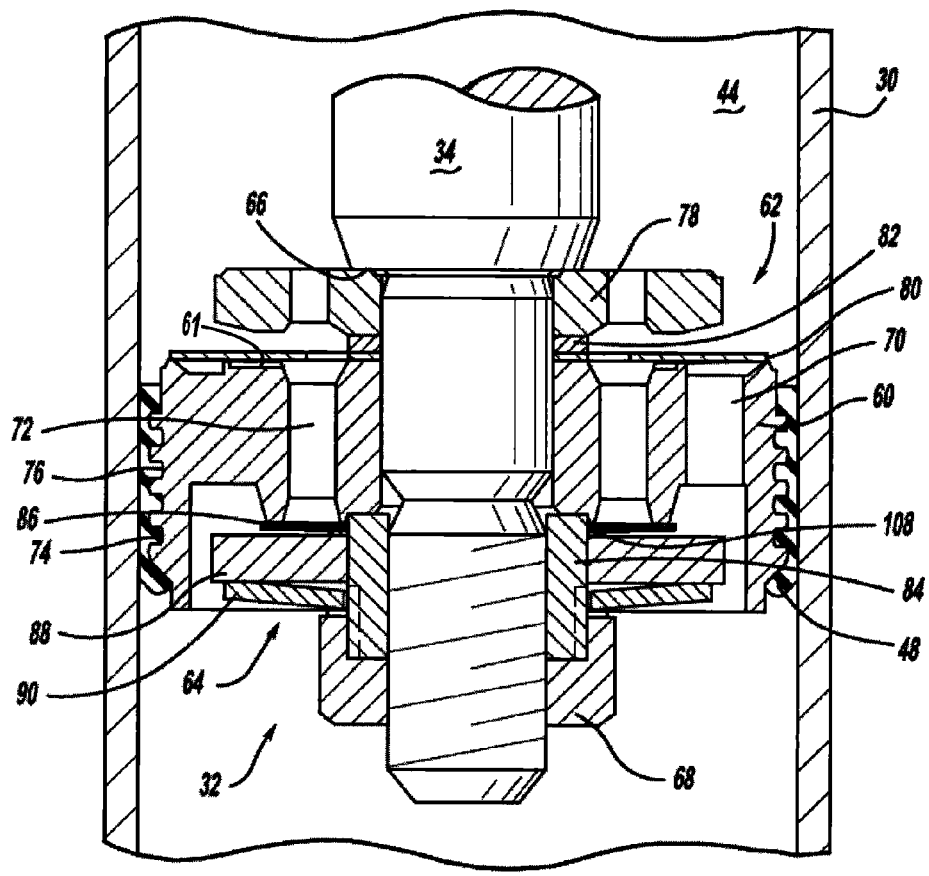
FIG. 3 is an enlarged side view, partially in cross-section of the piston assembly from the shock absorber illustrated in FIG. 2.

Referring now to FIG. 3, piston assembly 32 comprises a valve body 60, a compression valve assembly 62 and a rebound valve assembly 64. Compression valve assembly 62 is assembled against a shoulder 66 on piston rod 34. Valve body 60 is assembled against compression valve assembly 62 and rebound valve assembly 64 is assembled against valve body 60. A nut 68 secures these components to piston rod 34 which extends through a through bore extending through valve body 60.

Valve body 60 defines a plurality of compression passages 70 and a plurality of rebound passages 72. Seal 48 includes a plurality of ribs 74 which mate with a plurality of annular grooves 76 to permit sliding movement of piston assembly 32.

Compression valve assembly 62 comprises a support washer 78, a valve disc 80 and a spacer disc 82. Support washer 78 abuts shoulder 66 on one end and abuts spacer disc 82 on the opposite end. Spacer disc 82 abuts support washer 78 on one end and abuts valve disc 80 on the other end. Valve disc 80 abuts spacer disc 82 on one end and abuts a central hub of valve body 60 on the other end. Valve disc 80 abuts valve body 60 and closes compression passages 70 while leaving rebound passages 72 open. During a compression stroke, fluid in lower working chamber 46 is pressurized causing fluid pressure to react against valve disc 80. When the fluid pressure against valve disc 80 overcomes the bending load of valve disc 80, valve disc 80 deflects away from valve body 60 to open compression passages 70 and allow fluid flow from lower working chamber 46 to upper working chamber 44. Typically only a small fluid pressure acting on valve disc 80 will cause the deflection of valve disc 80 and compression valve assembly 62 acts as a check valve between chambers 46 and 44 and does not generate a damping load or only partially generates a damping load. The damping characteristics for shock absorber 20 during a compression stroke are typically controlled by base valve assembly 38 which accommodates the flow of fluid from lower working chamber 46 to reservoir chamber 52 due to the "rod volume" concept. During a rebound stroke, compression passages 70 are closed by valve disc 80.

Rebound valve assembly 64 comprises a spacer 84, a plurality of valve discs 86, a retainer 88 and a spring 90. Spacer 84 is threadingly received on piston rod 34 and is disposed between valve body 60 and nut 68. Spacer 84 retains valve body 60 and compression valve assembly 62 while permitting the tightening of nut 68 without compressing valve discs 86. Support washer 78, spacer disc 82, valve disc 80, valve body 60 and spacer 84 provide a continuous solid connection between shoulder 66 and nut 68 to facilitate the tightening and securing of nut 68 to spacer 84 and thus to piston rod 34. Valve discs 86 are slidingly received on spacer 84 and abut valve body 60 to close rebound passages 72 while leaving compression passages 70 open. Retainer 88 is also slidingly received on spacer 84 and it abuts valve discs 86. Spring 90 is assembled over spacer 84 and is disposed between retainer 88 and nut 68 which is threadingly received on spacer 84. Spring 90 biases retainer 88 against valve discs 86 and valve discs 86 against valve body 60. When fluid pressure is applied to valve discs 86, they will elastically deflect at the outer peripheral edge to open rebound valve assembly 64. A shim 108 is located between nut 68 and spring 90 to control the preload for spring 90 and thus the blow off pressure as described below. Thus, the calibration for the blow off feature of rebound valve assembly 64 is separate from the calibration for compression valve assembly 62.

During a rebound stroke, fluid in upper working chamber 44 is pressurized causing fluid pressure to react against valve discs 86. When the fluid pressure reacting against valve discs 86 overcomes the bending load for valve discs 86, valve discs 86 elastically deflect opening rebound passages 72 allowing fluid flow from upper working chamber 44 to lower working chamber 46. The strength of valve discs 86 and the size of rebound passages will determine the damping characteristics for rebound valve assembly 64. When the fluid pressure within upper working chamber 44 reaches a predetermined level, the fluid pressure will overcome the biasing load of spring 90 causing axial movement of retainer 88 and the plurality of valve discs 86. The axial movement of retainer 88 and valve discs 86 fully opens rebound passages 72 thus allowing the passage of a significant amount of damping fluid creating a blowing off of the fluid pressure which is required to prevent damage to shock absorber 20 and/or vehicle 10.

Figure 4:
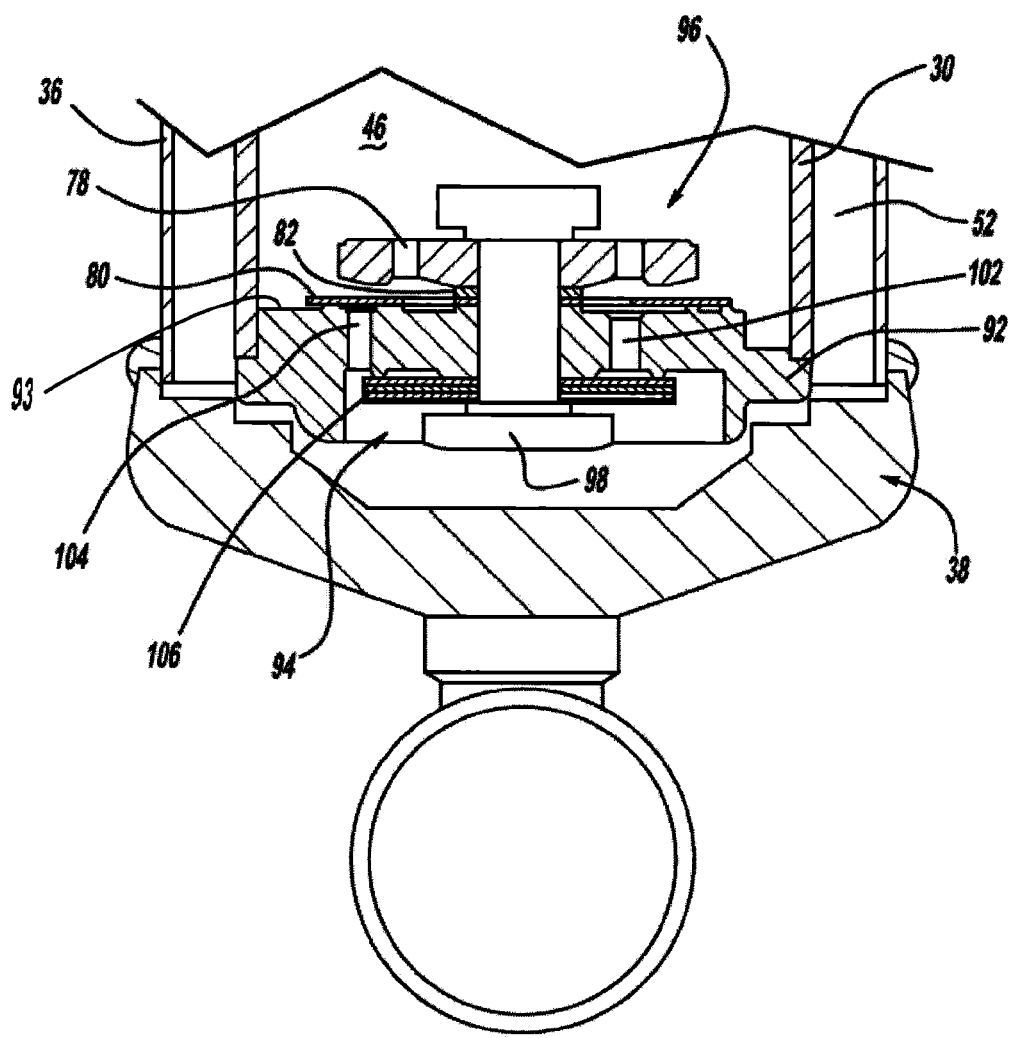
FIG. 4 is an enlarged side view, partially in cross-section of the base valve assembly from the shock absorber illustrated in FIG. 2.

Referring to FIG. 4, base valve assembly 38 comprises a valve body 92, a compression valve assembly 94 and a rebound valve assembly 96. Compression valve assembly 94 and rebound valve assembly 96 are attached to valve body 92 using a rivet 98 or a bolt and a nut. Valve body 92 defines a plurality of compression passages 102 and a plurality of rebound passages 104.

Compression valve assembly 94 comprises a plurality of valve discs 106 that are biased against valve body 92 by rivet 98. During a compression stroke, fluid in lower working chamber 46 is pressurized and the fluid pressure within compression passages 102 will eventually open compression valve assembly 94 by deflecting valve discs 106 in a manner similar to that described above for rebound valve assembly 64. Compression valve assembly 62 will open to allow fluid flow from lower working chamber 46 to upper working chamber 44 and only the "rod volume" will flow through compression valve assembly 94. The damping characteristics for shock absorber 20 are determined by the design of compression valve assembly 94 of base valve assembly 38.

Rebound valve assembly 96 comprises support washer 78, valve disc 80 and spacer disc 82. Valve disc 80 abuts valve body 92 and closes rebound passages 104. Spacer disc 82 is disposed directly between valve disc 80 and support washer 78 and support washer 78 is disposed directly between spacer disc 82 and rivet 98. During a rebound stroke, fluid in lower working chamber 46 is reduced in pressure causing fluid pressure in reservoir chamber 52 to react against valve disc 80. When the fluid pressure against valve disc 80 overcomes the bending load of valve disc 80, valve disc 80 deflects from valve body 92 to open rebound passages 104 and allow fluid flow from reservoir chamber 52 to lower working chamber 46. Typically only a small fluid pressure acting on valve disc 80 will cause the deflection of valve disc 80 and compression valve assembly 94 acts as a check valve between reservoir chamber 52 and lower working chamber 46 and doesn't generate a damping load or only partially generates a damping load. The damping characteristics for a rebound stroke are controlled by rebound valve assembly 64 as detailed above.

While rebound valve assembly 64 is illustrated having spacer 84, the plurality of valve discs 86, retainer 88 and spring 90, it is within the scope of the present disclosure to replace rebound valve assembly 64 with compression valve assembly 62. When compression valve assembly 62 is also used to replace rebound valve assembly 64, valve disc 80 would be redesigned such that the damping characteristics for shock absorber 20 are maintained during extension movements.

While compression valve assembly 94 is illustrated having the plurality of valve discs 106, it is within the scope of the present disclosure to replace compression valve assembly 94 with rebound valve assembly 96. When rebound valve assembly 96 is also used to replace compression valve assembly 94, valve disc 80 would be redesigned such that the damping characteristics for shock absorber 20 are maintained during jounce movements.

Referring now to FIGS. 3, 5 and 7, components of compression valve assembly 62 are illustrated in greater detail. As illustrated in FIGS. 3 and 5, valve body 60 comprises an outer valve land 110 and an inner valve land 112 projecting or extending from a planar surface 61 of the valve body 60. As illustrated in FIG. 5, inner valve land 112 has an oval shape. Outer valve land 110 is illustrated as a circular land having its center located at the center of circular valve body 60. Inner valve land 112 is illustrated as a non-circular land having four sections A-B, B-C, C-D and D-A. Section A-B is a circular section having its center located at the center of valve body 60. Section C-D is a circular section having its center located at a point spaced to the left of the center point of valve body 60 in FIG. 5. Sections B-C and D-A are transition sections between sections A-B and C-D. Sections B-C and D-A can be linear portions of inner valve land 112, they can be curved portions of inner valve land 112 or they can be any shape necessary to generate the required performance of compression valve assembly 62. Valve disc 80, which when it engages the entire upper surface surfaces of outer and inner valve lands 110, 112, forms a fluid chamber volume between the surface 61 of the valve body 60, the outer and inner valve lands 110, 112 and the valve disc 80.

As disclosed in FIG. 5, the area between outer valve land 110 and inner valve land 112 has a width dimension in the radial direction of valve body 60 that varies based upon the circumferential position of the width dimension.

When fluid pressure acts against valve disc 80, which closes the area between outer valve land 110 and inner valve land 112, the portion of the area between outer valve land 110 and inner valve land 112 that has the largest width dimension will exert a greater force on valve disc 80 due to a larger area of valve disc 80 being exposed to the fluid pressure. Thus, the portion of valve disc 80 located at the largest width direction of the area between valve lands 110 and 112 will open first followed by other portions of valve disc 80 in direct relation to the width dimension at these other portions. The curve that defines the opening of compression valve assembly 62 can be specified by the shape of outer valve land 110 and inner valve land 112.

As illustrated in FIG. 5, all of the plurality of fluid passages 70 are located non-symmetrically around an entire circumference of a circle defined by the outer valve land 110. Also, as illustrated in FIG. 5, the plurality of compression passages 70 are disposed only in a portion of the area between the outer valve land 110 and inner valve land 112 which correspond to a circumferential position where the width dimension between outer valve land 110 and inner valve land 112 is greater than the minimum width between outer valve land 110 and inner valve land 112. This location of compression passages 70 directs the fluid flow and the fluid pressure directly to the larger width dimension portions on valve disc 80 ensuring that the portion of valve disc 80 having the largest width dimension opens first.

Referring now to FIGS. 4, 6 and 7, components of rebound valve assembly 96 are illustrated in greater detail. As illustrated in FIGS. 4 and 6, valve body 92 comprises a planar surface 93 from which extends or projects outer valve land 110 and an inner valve land 112. Outer valve land 110 is illustrated as a circular land having its center located at the center of circular valve body 92. Inner valve land 112 is illustrated as a non-circular land having four sections A-B, B-C, C-D and D-A. Section A-B is a circular section having its center located at the center of valve body 92. Section C-D is a circular section having its center located at a point spaced to the left of the center point of valve body 92 in FIG. 6. Sections B-C and D-A are transition sections between sections A-B and C-D. Sections B-C and D-A can be linear portions of inner valve land 112, they can be curved portions of inner valve land 112 or they can be any shape necessary to generate the required performance of compression valve assembly 62. Valve disc 80 engages the entire upper flat surface of outer and inner valve lands 110, 112. As illustrated in FIGS. 5 and 6, inner valve land 112 has a constant width over its entire circumference and the upper flat surface of outer valve land 110 is coplanar with the upper flat surface of inner valve land 112.

As disclosed in FIG. 6, the area between outer valve land 110 and inner valve land 112 has a width dimension in the radial direction of valve body 92 that varies based upon the circumferential position of the width dimension. When the valve disc 80 engages the lands 110 and 112, a fluid chamber volume is formed between the planar surface 93, the valve lands 110, 112 and the valve disc 80.

When fluid pressure acts against valve disc 80, which closes the area between outer valve land 110 and inner valve land 112, the portion of the area between outer valve land 110 and inner valve land 112 that has the largest width dimension will exert a greater force on valve disc 80 due to a larger area of valve disc 80 being exposed to the fluid pressure. Thus, the portion of valve disc 80 located at the largest width direction of the area between valve lands 110 and 112 will open first followed by other portions of valve disc 80 in direct relation to the width dimension at these other portions. The curve that defines the opening of compression valve assembly 62 can be specified by the shape of outer valve land 110 and inner valve land 112.

As illustrated in FIG. 6, the plurality of rebound passages 104 are disposed only in a portion of the area between the outer valve land 110 and inner valve land 112 which correspond to a circumferential position where the width dimension between outer valve land 110 and inner valve land 112 is greater than the minimum width between outer valve land 110 and inner valve land 112. This location of rebound passages 104 directs the fluid flow and the fluid pressure directly to the larger width dimension portions on valve disc 80 ensuring that the portion of valve disc 80 having the largest width dimension opens first.

While compression valve assembly 62 and rebound valve assembly 96 are illustrated as a clamped valve disc design, it is within the scope of the present disclosure to use any other valve design for shock absorbers known in the art including, but not limited to, designs where the valve disc is biased against the piston body or the valve body by the biasing member such as a coil spring, a flange spring or other biasing members.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
a pressure tube defining a fluid chamber;
a piston assembly disposed within said pressure tube, said piston assembly dividing said fluid chamber into an upper working chamber and a lower working chamber;
a piston rod attached to said piston assembly, said piston rod extending in an axial direction through at least one of said upper and lower working chambers;
a first valve assembly engaging said piston assembly, said first valve assembly including a first valve body and a first valve disc engaging said first valve body, said piston rod extending through a through bore in said first valve body;
a first non-circular inner valve land extending from said first valve piston body, said first valve disc directly engaging said first non-circular inner valve land;
a first circular outer valve land extending from said first valve body, said first circular outer valve land being disposed radially outward from said first non-circular inner valve land and fully encircling said first non-circular inner valve land, said first valve disc directly engaging said first outer valve land to form a fluid chamber volume between said first valve body, said first non-circular inner valve land, said first circular outer valve land and said first valve disc, said fluid chamber volume extending in a full circumferential path to fully circumscribe the through bore of the first valve body;

a first plurality of fluid passages extending through said first valve body, said first plurality of passages disposed between said piston rod and said first non-circular inner valve land;

a second plurality of fluid passages extending through said first valve body, said second plurality of passages disposed between said first non-circular inner valve land and said first circular outer valve land; wherein said first valve disc always directly engages said first non-linear inner valve land and said first circular outer valve land when said first valve assembly is in a closed position;

all of said second plurality of fluid passages are located non-symmetrically around an entire circumference of a circle defined by said first circular outer valve land;

said first non-circular inner valve land includes a first circular portion, a second circular portion, a first transition portion and a second transition portion, said first transition portion extending from a first end of said first circular portion to a first end of said second circular portion, said second transition portion extending from a second end of said first circular portion to a second end of said second circular portion; and a center of said first circular portion being coaxial with a center of said first circular outer valve land and a center of said second circular portion being spaced from said center of said first circular outer valve land.

2. The shock absorber according to claim 1, wherein a radial dimension between said first non-circular inner valve land and said first circular outer valve land varies based upon a circumferential position of said radial dimension.

3. The shock absorber according to claim 2, wherein said second plurality of passages defined by said first valve body are located circumferentially in a position between said first non-circular inner valve land and said first circular outer valve land where said radial dimension is greater than a smallest radial dimension between said first non-circular inner valve land and said first circular outer valve land.

4. The shock absorber according to claim 1, further comprising:

a reserve tube surrounding said pressure tube, a reservoir chamber being defined between said pressure tube and said reservoir tube;

a second valve assembly engaging said base valve assembly, said second valve assembly including a second valve body and a second valve disc engaging said second valve body; wherein said second valve body defines a second circular outer valve land and a second non-circular inner valve land, said second valve disc engaging said second non-circular inner valve land and said second circular outer valve land.

5. The shock absorber according to claim 4, wherein a radial dimension between said second non-circular inner valve land and said second circular outer valve land varies based upon a circumferential position of said radial dimension.

6. The shock absorber according to claim 5, wherein a third plurality of passages defined by said second valve body are located circumferentially in a position between said second non-circular inner valve land and said second circular outer valve land where said radial dimension is greater than a smallest radial dimension between said second non-circular inner valve land and said second circular outer valve land.

7. The shock absorber according to claim 1, wherein said first non-circular inner valve land includes a first flat surface directly engaging said first valve disc and said first circular outer valve land includes a second flat surface directly engaging said first valve disc, said first flat surface being coplanar with said second flat surface.

8. The shock absorber according to claim 1, wherein said first non-circular inner valve land has a constant width over an entire circumference of said first non-circular inner valve land.

9. The shock absorber according to claim 1, wherein a radial distance between said first non-circular inner valve land and said first circular outer valve land varies from a minimum distance at a first circumferential position to a maximum distance at a second circumferential position, one of said second plurality of fluid passages being provided at said second circumferential position but not at said first circumferential position.

10. The shock absorber according to claim 1, wherein said first and second transition portions include a linear portion.

11. The shock absorber according to claim 1, wherein said first and second transition portions include a non-linear portion.

12. The shock absorber according to claim 1, wherein the center of said first circular portion is spaced from the center of said second circular portion by a dimension equal to a distance between said first end of said first circular portion and said first end of said second circular portion.

* * * * *

UNITED STATES PATENT AND TRADEMARK OFFICE
CERTIFICATE OF CORRECTION

PATENT NO. : 9,169,890 B2
APPLICATION NO. : 13/187647
DATED : October 27, 2015
INVENTOR(S) : Gary W. Groves et al.

Page 1 of 1

It is certified that error appears in the above-identified patent and that said Letters Patent is hereby corrected as shown below:

In the Specification:

At column 6, line number 66, before "surfaces" delete "surface".

In the Claims:

At column 8, line 55, Claim 1, after "valve" delete "piston".

Signed and Sealed this
Ninth Day of August, 2016

Michelle K. Lee
*Director of the United States Patent and Trademark Office*